United States Patent [19]
Eisele

[11] 3,732,624
[45] May 15, 1973

[54] SPINDLE FOR DIAL INDICATOR GAUGE

[75] Inventor: Andrew Eisele, Desert Hot Springs, Calif.

[73] Assignee: Dunn Tool Company, Livonia, Mich.

[22] Filed: Oct. 20, 1971

[21] Appl. No.: 191,041

[52] U.S. Cl. .............................. 33/174 Q, 33/172 R
[51] Int. Cl. ......................... G01b 5/00, G01b 5/24
[58] Field of Search ...................... 33/174 Q, 174 R, 33/172 R, 169 R, 178 R, 143 R, 143 G, 143 H, 147 R, 147 F, 147 H, 147 J, 147 G, 147 K, 147 L

[56] References Cited

UNITED STATES PATENTS

| | | |
|---|---|---|
| 3,114,207 | 12/1963 | Eisele .............................. 33/174 Q |
| 3,178,828 | 4/1965 | Eisele .............................. 33/174 Q |
| 3,209,460 | 10/1965 | Eisele .............................. 33/174 Q |

Primary Examiner—Louis R. Prince
Assistant Examiner—John M. Jillions
Attorney—Willis Bugbee

[57] ABSTRACT

Adapted to be mounted in a reference bore of a master fixture is a hole-location and concentricity-measuring spindle having a hollow supporting shaft with a large-diameter cylindrical rearward pilot portion, an intermediate-diameter middle portion and a small diameter forward portion. The intermediate and small diameter portions are provided respectively with axially-spaced parallel transverse bores containing respectively a first hole-location measuring pin or probe and a second hole-location measuring pin or probe. Each probe is slotted transversely intermediate its opposite ends to provide a sharp contact edge engageable with a flat-topped half-conical cam surface on a motion-transmitting rod which is reciprocable in a longitudinal bore of the hollow spindle. These two half-conical cam surfaces are disposed 90° apart from one another around the rod, which near its rearward end is provided with a pair of flat-bottomed diametral notches also disposed 90° apart from one another in co-planar relationship with the flat tops of the half-conical cam portions. A rotatable probe selector knob on its inner end has a crank pin selectively and successively slidably engageable with the flat bottoms of the two notches with the result of rotating the rod to engage one of the probes with its conical cam while disengaging the other probe from its conical cam. The reduced-diameter inner end of the hollow shaft is adapted to be mounted in the handle socket of a conventional relatively-rotatable dial indicator holder operatively connecting the reciprocable motion-transmitting rod with the reciprocable operating plunger of the dial indicator.

12 Claims, 14 Drawing Figures

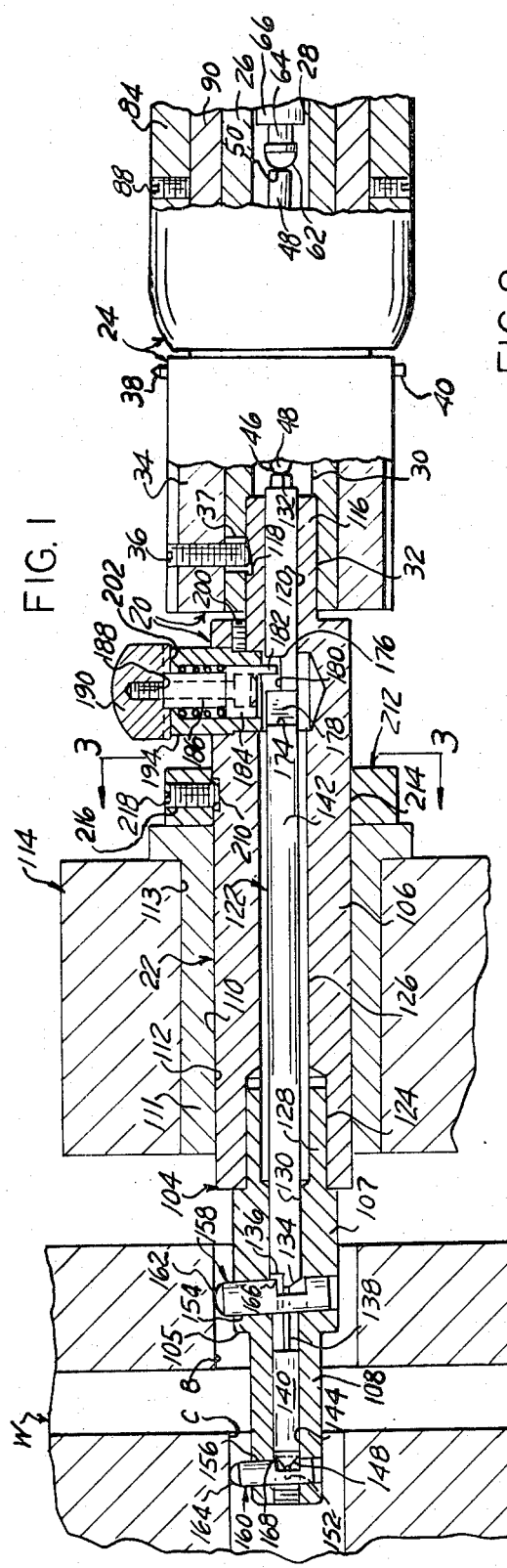

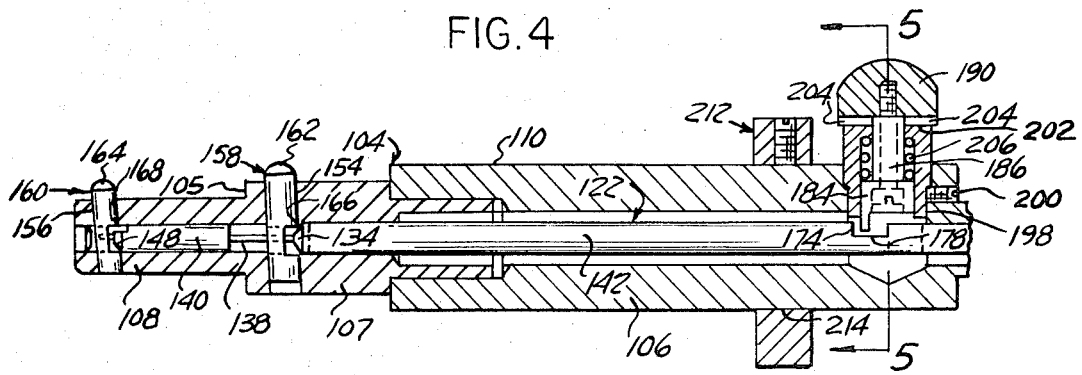
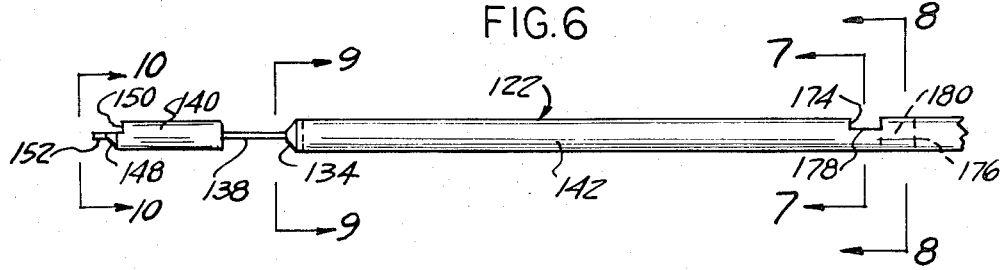
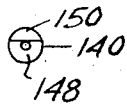   
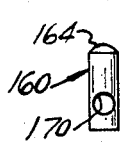 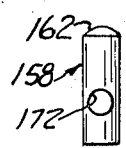 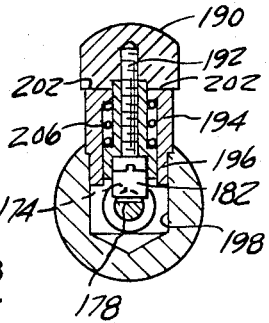
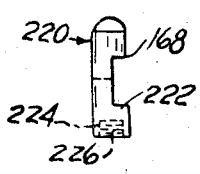

SPINDLE FOR DIAL INDICATOR GAUGE

SUMMARY OF THE INVENTION

With this gauge the operator can quickly measure in rapid succession the precise locations and concentricity of the first and second holes relatively to the reference bore of the master fixture. With the pilot portion snugly but rotatably inserted in the reference bore, and with the intermediate and forward shaft portions inserted in the first and second holes respectively of the workpiece, the operator rotates the probe selector knob to engage the first hole probe with the first probe cam while disengaging the second probe from the other cam. He then rotates the handle and consequently the hollow shaft to measure on the dial indicator the location of the first hole relatively to the reference bore. He now rotates the probe selector knob to engage the second hole probe with the second hole probe cam while disengaging the first hole probe from the first hole probe cam and then similarly measures on the dial indicator the location of the second hole relatively to the reference bore. These measurements are performed with this single gauge without removing it from the master fixture. By moving the gauge inward or outward in the reference bore so as to take hole location measurements at different depths of the first and second holes, the operator can also measure the "squareness" or coaxiality thereof relatively to the reference bore, which is square to a reference surface.

In the drawings,

FIG. 1 is a central longitudinal section through a double-probe hole-location and concentricity-measuring spindle mounted in the socket of a conventional relatively-rotatable dial indicator holder, according to the invention, with the first-hole probe de-activated and the second-hole probe activated;

FIG. 2 is a side elevation partly in central longitudinal section of the remainder of the conventional relatively-rotatable dial indicator holder of FIG. 1, with the dial indicator rotated into a vertical plane for convenience of showing;

FIG. 3 is a cross-section taken along the line 3—3 of FIG. 1, showing the stop collar;

FIG. 4 is a similar section of the left-hand or forward portion of FIG. 1, but showing the measuring spindle with the selector knob rotated so as to rotate the motion-transmitting rod and thereby to activate the first-hole probe and to de-activate the second-hole probe;

FIG. 5 is a cross-section taken along the line 5—5 in FIG. 4;

FIG. 6 is a side elevation of the forward portion of the motion-transmitting rod in the position shown in FIG. 4;

FIG. 7 is a cross-section taken along the line 7—7 in FIG. 6;

FIG. 8 is a cross-section taken along the line 8—8 in FIG. 6;

FIG. 9 is a section taken along the line 9—9 in FIG. 6;

FIG. 10 is a left-hand end elevation looking in the direction of the arrows 10—10 in FIG. 6;

FIG. 11 is a front elevation of the second-hole probe;

FIG. 12 is a front elevation of the first-hole probe;

FIG. 13 is a side elevation of a modified probe; and

FIG. 14 is a rear elevation of the modified probe shown in FIG. 13.

Referring to the drawings in detail, FIGS. 1 and 2 show a double-probe hole-location or concentricity or coaxiality gauge, generally designated 20, according to one form of the invention as consisting generally of a measuring spindle 22 furnished in various sizes adapted to be interchangeably inserted in a conventional relatively-rotatable dial indicator holder 24. The dial indicator holder 24 includes an elongated tubular support 26 having a bore 28 therein terminating at its forward end in a counterbore 30 which in turn opens into a counterbore or chuck socket 32 adapted to receive the interchangeable measuring spindles 22 in a manner described more fully below. Mounted in telescoped relationship upon the forward end of the tubular support 26 is a longitudinally-fluted rotary handle 34 in the form of a sleeve drilled and threaded near its forward end to receive a set screw 36, the inner end of which passes through a clearance hole 37 into the socket 32. The rearward end of the rotary handle 34 is drilled in alignment with the set screw 36 to snugly and fixedly receive a pointer 38 for indicating to the operator the exact location of the point within the workpiece bore and counterbore where probe contact is being made at any particular instant. Diametrically opposite the pointer 38, the rotary handle 34 is drilled to similarly snugly receive a blunt end 40 showing the point in the workpiece bore or counterbore diametrically opposite the above-mentioned contact point.

Projecting into the rearward end of the counterbore 30 is the rounded forward end 46 of a forwardly spring-pressed rearward motion-transmitting rod 48 slidably mounted in the tubular support 26. The rearward end 50 of the rearward motion-transmitting rod 48 engages a hemispherical contact button 62 on the outer end of the plunger 64 reciprocably mounted in the tubular stem 66 of a conventional dial indicator 68 having a casing 70 (FIG. 2) containing a dial 72 provided with a circular scale 74 having graduations 76 in customary dimensional units such as thousandths or ten-thousandths of an inch. Registering with the graduations 76 on the scale 74 is an indicator needle 78 mounted on a rotary needle shaft 80 connected by motion-multiplying mechanism to the dial indicator plunger 64. The dial indicator 68 is mounted in the cup-shaped recess 82 of a dial indicator hosing 84 having a stationary tubular handle boss or barrel 86 which is drilled and threaded to receive a pair of set screws 88 by which it is secured to flat spots 92 on a sleeve 90 which in turn is mounted on the relatively-rotatable tubular support 26 in telescoping relationship thereto. In this manner, the tubular support 26 is rotatably mounted within the sleeve 90 so that the dial indicator head 24 can be held stationary with one hand grasping the stem 86 while the other hand grasps and turns the handle 34.

The measuring spindle 22 (FIG. 1) includes a composite hollow shaft 104 made up of separate forward and rearward components 105 and 106. The forward component 105 has intermediate and forward portions 107 and 108 respectively of successively decreasing diameters. The rearward portion or component 106 of largest diameter is of generally cylindrical form and has an external cylindrical pilot surface 110 which is adapted to snugly but rotatably fit a reference bore 112 in a flanged hardened steel bearing bushing 111 seated in a bore 113 in a stationary master fixture 114. The latter is fixedly mounted and has associated therewith means (not shown) well known to those skilled in the mechanical manufacturing industries, but forming no part of the present invention, for holding in registry with the bore 112 of the master fixture 114 a workpiece W, such as an automobile engine crankcase, having therein holes or bores B and C intended to be so machined as to be at predetermined locations relatively to one another and to the reference bore 112 in the master fixture 114, or said reference bore 112 or, as commonly stated in such industries, "concentric" with one another.

Projecting rearward from the rearward shaft portion 106 and integral therewith is a reduced-diameter hollow shank 116 adapted to snugly but removably fit the counterbore 32 in telescoping relationship therewith and to be removably held therein by the set screw 36 engaging in inclined flat bottomed-notch 118 in the shank 116 (FIG. 1). The rearward shaft portion 106 within the stem 116 is provided with a rearward bearing bore 120 within which a forward motion-transmitting rod 122 is both reciprocably and rotatably mounted. The forward and intermediate portions 108 and 107 of the composite stepped shaft 104 are made integral with one another but in a separate component 105 from the rearward portion 106 thereof, for convenience of manufacture. It will be understood however that the shaft 104 may be made in one piece if desired, with the components 105 and 106 unitary therewith. For this purpose, the forward end of the rearward shaft portion 106 is provided with the counterbore 124 of a longitudinal bore 126 traversing the rearward shaft portion 106 coaxial with the cylindrical pilot surface 110, with which the bore 120 and counterbore 124 are coaxial. Snugly and securely fitted into the forward counterbore 124 is the reduced-diameter stem portion 128 of the intermediate shaft portion 107, which in turn is provided with a forward bearing bore 130 coaxial with the rearward bearing bore 120 and also reciprocably and rotatably receiving the forward motion-transmitting rod 122.

The forward motion-transmitting rod 122 has a reduced diameter flat rearward end 132 engaging the rounded forward end of the rearward motion-transmitting rod 48 for imparting reciprocatory motion thereto. Immediately forward of the forward bearing bore 130 the forward motion-transmitting rod 122 is provided with a half-conical first hole probe cam portion 134 (FIGS. 1 and 6) which as its name suggests encircles only approximately one-half of the forward motion-transmitting rod 122, the remainder thereof being cut away in a rearward clearance notch or slot 136, the horizontal or axial portion of which is disposed slightly to one side of the axis of the rod 122. Extending forward from the junction of the half conical cam portion 134 and the clearance notch 136 is a reduced diameter intermediate neck portion 138 which terminates in a forward rod portion 140 which is of slightly less diameter than the rearward portion 142 thereof and which is slidably and rotatably journaled in a correspondingly smaller diameter forward bore 144 (FIG. 1) in the reduced diameter forward portion 108 of the composite hollow shaft 104. The reduced-diameter forward portion 140 of the forward motion-transmitting rod 122 is provided with a half-conical second hole-probe cam portion 148 (FIG. 6) which like the half-conical first hole-probe cam portion 134 encircles only approximately one-half of the forward portion 140, the remainder being also cut away in a forward clearance notch 150. The forward clearance notch 150, however, as shown by a comparison of FIGS. 9 and 10, is rotated approximately 90° from the rearward clearance notch 136. Extending forward from the half conical cam portion 148 is a reduced diameter end portion 152.

The intermediate and forward shaft portions 107 and 108 near their forward ends are provided with transverse bores 154 and 156 inclined forwardly at an angle of approximately 87° in spaced parallel relationship to one another (FIG. 1) to reciprocably receive first hole and second hole probes 158 and 160 respectively. Each probe 158 and 160 has a rounded outer end 162 and 164 respectively engageable with the first hole B and second hole C. The probes 158 and 160 are notched out intermediate their ends adjacent the half-conical cam portions 134 and 148 to provide sharp cam-engaging edges 166 and 168 respectively. The reduced diameter end portion 152 extends into a hole 170 in the second hole probe 160 whereas the neck portion 138 passes through a larger hole 172 in the first hole probe 158, the hole 172 being of sufficient size for the passage of the forward rod portion 140.

Intermediate the first hole probe cam portion 134 and the rearward end 132 of the forward motion-transmitting rod 122, the latter is provided with a forward flat-bottomed slot 174 and a rearward flat-bottomed slot 176 (FIGS. 1 and 6) disposed adjacent one another and rotated 90 degrees relatively to one another with the forward slot bottom flat 178 and the rearward slot bottom flat 180 disposed substantially coplanar with the respective flats of the forward and rearward cutaway portions 150 and 136 of the forward motion-transmitting rod 122. Selectively engageable with the flats 178 and 180 is a rotary crank pin 182 projecting downward from the bottom of the head 184 of a shaft 186, the reduced-diameter portion 188 of which carries a knob 190 drilled and threaded to receive the correspondingly-threaded end portion of a screw 192 (FIG. 5) passing through the axially-drilled reduced diameter portion 188. The reduced diameter portion 188 of the shaft 186 and the head 184 are rotatably journalled in a correspondingly-bored hollow thimble 194, the reduced diameter end portion of which is seated in a transverse blind bore 198 of the rearward shaft portion 106 in alignment with the flats 178 and 180 on the forward motion-transmitting rod 122. The rearward end of the rearward shaft portion 106 is drilled and threaded to receive a set screw 200 extending into engagement with the thimble 194 to lock the latter firmly in position. The upper end of the thimble 194 is provided with aligned radial notches 202 which receive correspondingly-shaped radial lugs 204 extending downward therein from the bottom of the knob 190. A compression coil spring 206 mounted within the hollow thimble 194 engages and constantly urges downward the head 184 of the shaft 186.

In order to limit the depth to which the hollow shaft 104 can be inserted in the reference bore 112 of the master fixture 114, the rearward component or portion 106 is provided with a flat-bottomed transverse slot 210. A stop collar 212 with a central bore 214 matching the pilot surface 110 is slid therein until the radial threaded hole 216 registers with the slot 210 whereupon a radial set screw 218 is tightened to lock the stop collar 212 on the rearward component or portion 106 of the hollow stepped shaft 104.

In the operation of the invention, let it be assumed that the workpiece W has been placed in registry with the master fixture 114 with its first hole B and second hole C intendedly coaxial with the reference bore 112 in the bearing bushing 111. To measure the locations of the first and second holes B and C in succession relatively to the reference bore 112, the operator pushes the forward component 105 of the hollow shaft 104 through the reference bore 112 into the workpiece W so that the first hole probe 158 and second hole probe 160 engage the first hole B and second hole C thereof respectively. The same action pushes the rearward component or portion 106 into the reference bore 112 so that its cylindrical external pilot surface 110 snugly but slidably and rotatably engages the reference bore 112 of the master fixture 114. In so doing the operator grasps the stationary dial indicator housing 84 in one hand and the rotary handle 34 in his other hand.

The operator with one of his hands now lifts and rotates the feeler selector knob 190 one-half turn to rotate the forward motion transmitting rod 142 one quarter turn into the position shown in FIG. 1 thereby causing the sharp edge 168 of the second hole probe 160 to engage the forward half-conical cam 148 while disengaging the sharp edge 166 of the first hole probe 158 from the rearward half-conical cam 134. The operator then rotates the rotary handle 34 to effect rotation of the hollow shaft 104, whereupon the rounded end 164 of the second hole probe 160 traces out a circular or arcuate path in the second hole C. If the second hole C is not truly coaxial with the reference bore 112 or is not in the intended location relatively thereto, the second hole probe 160, in the following its circular path therein, will move inward and outward in its transverse bore 156 causing its sharp edge 168 to slide relatively to the half conical cam 148, thereby reciprocating the forward motion-transmitting rod 142, with consequent reciprocation of the rearward motion-transmitting rod 48 and dial indicator plunger 64, with resulting swinging of the dial indicator needle 78 back and forth along the circular scale 74, the graduations 76 of which indicate the departure from intended location or coaxiality or concentricity of the second hole C from the reference bore 112.

To measure the concentricity or coaxiality of the first hole B with the reference bore 112, the operator again lifts the knob 190 so that its lugs 204 are freed from their respective notches 202 and rotates the knob 190 a half turn, thereby rotating the forward motion-transmitting rod 142 a quarter turn from the position of FIG. 1 to that of FIG. 4. This action disengages the sharp edge 168 of the second hole probe 160 from the forward half-conical cam 148 and engages the sharp edge 166 of the first hole probe 158 with the rearward half-conical cam 134. As before, the operator while holding the dial indicator housing 84 stationary with one hand rotates the rotary handle 34 with his other hand. This action causes the rounded end 162 of the first hole probe 158 to trace out a circular path in the first hole B, resulting in no motion of the first hole probe counterbore probe 158 and consequently no motion of the motion-transmitting rods 142 and 48 and dial indicator plunger 64 and needle 78 if the first hole B is truly coaxial or "concentric" with the reference bore 112 or in the intended location relatively thereto. Again, if the first bore B is not exactly coaxial or "concentric" with the reference bore 112 or is not in the intended location relatively thereto, the first hole probe 158 will move inward and outward in its transverse bore 154, causing its sharp edge 166 to engage and move the half conical rearward cam 134, with consequent reciprocation of the motion-transmitting rods 142 and 48 and dial indicator plunger 64, with resultant swinging of the dial indicator needle 78 along the graduated scale 74 to indicate the departure from concentricity or coaxiality or intended location of the first hole B with respect to the reference bore 112.

In addition to these successive inspections and measurements, the operator, by moving the concentricity gauge 20 inward or outward with respect to the master fixture reference bore 112 and the first hole B and second hole C, may also check these holes B and C for so-called "squareness" a departure from which causes the axis of the first hole B and second hole C to be inclined relatively to the axis of the reference bore 112. Here again, the rounded ends 162 and 164 of the first and second hole probes 158 and 160 following circular paths at different depths will indicate by the motion of the dial indicator needle 78 back and forth along its graduated scale 74, any departure from such "squareness" or lack of coaxiality.

The modified probe, generally designated 220, shown in FIGS. 13 and 14, is employed for the same purpose and in the same manner as the probe 158 of FIG. 12, and its construction is capable of being substituted for that of the probe 158. The modified probe 220 differs from the probe 158 in eliminating the large diameter hole 172 which in FIG. 12 is necessary to permit passage therethrough of the enlarged-diameter forward rod portion 140, which weakens the probe construction. Instead, the probe 220 is provided with a narrow longitudinal slot 222 which extends from the rearward end of the probe 220 inward to the middle of the notch providing the sharp edge 168. The slot 222 thus needs only to be wide enough to accommodate the reduced diameter intermediate neck portion 138. At its outer end the slot 222 is provided with a threaded hole 224 closed by a correspondingly-threaded plug 226 after assembly of the measuring spindle 22 has been made in the manner described above. The greatly decreased width of the slot 222 as compared with the much greater diameter of the hole 172 (FIG. 12) imparts much greater strength to the probe 220. I claim:

1. A double-probe hole-location or concentricity gauge spindle adapted to be operatively connected to the operating plunger of a dial indicator carried by a dial indicator holder, for measuring on said dial indicator the location or concentricity of first and second holes in a workpiece relatively to a reference bore, said gauge spindle comprising
    an elongated probe-supporting structure with a longitudinal bore therethrough and having a rearward portion adapted to be connected to said dial indicator holder and having a forward portion containing axially-spaced forward and rearward probe bores disposed transversely to said longitudinal bore and communicating therewith,
    a workpiece first hole probe reciprocably mounted in said rearward probe bore,
    a workpiece second hole probe reciprocably mounted in said forward probe bore,
    an elongated motion-transmitting member rotatably and reciprocably mounted in said longitudinal bore with a forward portion extending into said transverse bores and with a rearward portion adapted to be operatively connected to the dial indicator plunger, a rearward transverse-to-longitudinal motion-converting device disposed between said first hole probe and said motion-transmitting member, a forward transverse-to-longitudinal motion-converting device disposed between said second hole probe and said motion-transmitting member, said motion-converting devices being movable, responsive to the rotation of said motion-transmitting member, alternately between temporarily operative and temporarily inoperative positions, each of said motion-converting devices being in its operative position when the other motion-converting device is in its inoperative position, and means for selectively rotating said motion-transmitting member to thereby move said motion-converting devices into their alternate positions.

2. A double-probe hole-location or concentricity gauge spindle, according to claim 1, wherein each of said motion-converting devices includes a cam on said motion-transmitting member and a contact portion on its respective probe engageable with said cam in a predetermined position of rotation of said motion-transmitting member.

3. A double-probe hole-location or concentricity gauge spindle, according to claim 2, wherein said cam occupies a partially-circumferential portion of said motion-transmitting member.

4. A double-probe hole-location or concentricity gauge spindle, according to claim 3, wherein a cutaway probe clearance portion occupies the remaining circumferential portion of said motion-transmitting member.

5. A double-probe hole-location or concentricity gauge spindle, according to claim 4, wherein said clearance portion comprises an approximately diametral notch in said motion-transmitting member disposed adjacent said cam.

6. A double-probe hole-location or concentricity gauge spindle, according to claim 2, wherein said cam comprises a partially-conical portion on said motion-transmitting member.

7. A double-probe hole-location or concentricity gauge spindle, according to claim 2, wherein said contact portion comprises a sharp edge on said respective probe.

8. A double-probe hole-location or concentricity gauge spindle, according to claim 1, wherein said selectively-rotating means includes a pair of cutaway portions of said motion-transmitting member disposed adjacent one another in circumferentially-rotated angularly-disposed positions, and also includes a rotatable operating element having a contact portion successively engageable with said cutaway portions in response to rotation of said operating element.

9. A double-probe hole-location or concentricity gauge spindle, according to claim 8, wherein said cutaway portions include substantially flat-bottomed transverse notches in said motion-transmitting member, and wherein said contact portion successively engages the flat bottoms of said notches upon rotation of said operating element.

10. A double-probe hole-location or concentricity gauge spindle, according to claim 8, wherein said contact portion comprises a crank pin projection on said rotatable operating element.

11. A double-probe hole-location or concentricity gauge spindle, according to claim 1, wherein said first-hole probe has an opening therethrough disposed transversely thereto intermediate the opposite ends thereof, and wherein a portion intermediate the ends of said motion-transmitting member passes through said opening to said second-hole probe.

12. A double-probe hole-location or concentricity gauge spindle, according to claim 11, wherein said first-hole probe opening comprises a slot extending inward from one end thereof, wherein said intermediate portion of said motion-transmitting rod is of reduced diameter relatively to the remainder thereof and passes through said slot, and wherein a closure element is mounted in the outer end of said slot whereby to retain said probe on said motion-transmitting rod.

* * * * *